(12) United States Patent
Mockry et al.

(10) Patent No.: US 7,628,716 B2
(45) Date of Patent: Dec. 8, 2009

(54) METHOD OF RECORDING AND PLAYING BASEBALL GAME SHOWING EACH BATTER'S LAST PITCH

(76) Inventors: George M. Mockry, 62880 W. Lasalle Rd., #125, Montrose, CO (US) 81401; Greg M. Mockry, 185 Cook Rd., Massena, NY (US) 13662

( * ) Notice: Subject to any disclaimer, the term of this patent is extended or adjusted under 35 U.S.C. 154(b) by 1845 days.

(21) Appl. No.: 09/878,860

(22) Filed: Jun. 9, 2001

(65) Prior Publication Data

US 2003/0060311 A1 Mar. 27, 2003

Related U.S. Application Data

(60) Provisional application No. 60/211,208, filed on Jun. 13, 2000.

(51) Int. Cl.
*A63B 67/00* (2006.01)
(52) U.S. Cl. ...................................... 473/468
(58) Field of Classification Search ................ 473/468, 473/415–421, 434, 499–501, FOR. 102, 465; 273/317.6, 244.1
See application file for complete search history.

(56) References Cited

U.S. PATENT DOCUMENTS 6,493,872 B1 * 12/2002 Rangan et al. ................. 725/32

OTHER PUBLICATIONS

School and Sports Video Projects- Jun. 2001- www.videoccasions-nw.com/voschool.html—pp. 1-4.*
Video Taping Your Sports Event- Dec. 2000 -www.fostervideo.com/millennium-Pro-Sports-Video-2000.html -pp. 1-4.*
Cueing- Dec. 1997-http://www.sssm.com/editing/museum/rca/rca.html- SE1, p. 2.*
Web Page, Videoccasions: Do It for the Kids: School and Sports Video, 1998,1999,2000 copyright, Downloaded from web-Jan. 11, 2005, www.videoccasions-nw.com/voschool.html,4 pages.*
Web Page, FosterVideo Millennium Pro Sports Video 2000, Downloaded from web-Jan. 11, 2005, www.fostervideo.com/millennium-Pro-Sports-Video-2000.html, 2 pages.*
Web Page, Now Playing: Movies on The Net, Jan. 2000, Downloaded from web-Jan. 11, 2005, www.ecommerce-guide.com/news/trends/print.php/289961,2 pages.*
Web Page, SeasonTicket, Apr. 2000, Downloaded from web-Feb. 8, 2005, www.findarticles.com,2 pages.*
Web Page, SeasonTicket, Aug. 2000, Downloaded from web-Feb. 8, 2005, www.gambling-associates.com, 1 page.*
Web Page, Customized video highlights, Aug. 24, 2000, Downloaded from web-Aug. 26, 2003, http://www.mlsnet.com/content/00/mls0824seasonticket.html, 2 pages.*
Web page downloaded on Jun. 21, 2005, Software transforms TV into highlights, www.geeknews/2003/gee2003, 1 page.*
Web page downloaded on Jun. 21, 2005, Raptors Theater, www.nba/com/Raptors/archive99.html, 2 pages.*
Web page downloaded on Jun. 21, 2005, HistoricFilms, www.historicfilms.com/historic/mainframe.asp, 1 page.*
Web page downloaded on Oct. 20, 2005, ProQuest-Producing SportChannel, Jul. 18, 1997, www.proquest.umi.com, 3 pages.*
Web page downloaded on Oct. 20, 2005, ProQuest-Baseball Lite, Jul. 26, 1995, www.proquest.umi.com, 1 page.*
Web page downloaded on Oct. 20, 2005, ProQuest-Watching in Fast Forward, May 5, 2002, www.proquest.umi.com, 1 page.*
Web page downloaded on Oct. 20, 2005, The Media Channell, 1998, www.web.archive.org/mediachannel.com, 6 pages.*
ProQuest Article- Full writeup, Baseball Lite: All the Hits without the fat, 1995, http://www.sfgate.com/cgi-bin/article.cgi?f=/e/a/1995/07/26/STYLE14634.dtl&type=printable, 5 pages.*
Press Release Major League Baseball, Mar. 27, 2001 (http://pressbox.mlb.com/NASApp/mlb/pressbox/news/pressbox_news_story.jsp?article_id+...).
Press Release Major League Baseball Mar. 5, 2002 (http://mlb.mlb.com/NASApp/mlb/mlb/homepage/mlb_homepage.jsp).
Press Release Major League Baseball, Apr. 1, 2003 (http://mlb.mlb.com.NASApp/mlb/mlb/news/mlb_com_press_release.jsp?ymd=20030401&...).
Dave Boling, Apr. 11, 2002, "Baseball for the Short Attention Span" (htpp://www.tcpalm.com/tcp/baseball/article/0,1651,TCP_1057_1082008,00.html).
Letter dated Aug. 1, 2000 from Greg M. Mockry to Ethan Orlinsky.

* cited by examiner

*Primary Examiner*—Gene Kim
*Assistant Examiner*—M Chambers
(74) *Attorney, Agent, or Firm*—Banner & Witcoff, Ltd.

(57) ABSTRACT

A recorded complete baseball game is condensed into about fifteen minutes of action. All of the at-bat appearances of the players, in turn, are recorded, and then the recorded game is edited to leave only the last pitch thrown to each player, plus any action ensuing after that pitch and any attempts of runners to advance to another base and any other outs, such a runner as being picked off base. Then the recorded edited game is presented to viewers as a condensed game. The condensed game can be presented to subscribers over the Internet, or may be presented on film or as a video recording.

5 Claims, No Drawings

METHOD OF RECORDING AND PLAYING BASEBALL GAME SHOWING EACH BATTER'S LAST PITCH

CROSS REFERENCE TO RELATED APPLICATIONS

This application claims the benefit under 35 U.S.C. 119 of previously filed Provisional application 60/211,208 filed Jun. 13, 2000.

BACKGROUND OF THE INVENTION

1. Field of the Invention

This invention broadly relates to a method for reducing the time needed to enjoy a complete baseball game, and especially relates to a method for replaying or rebroadcasting a baseball game in a manner so that the viewer sees only the outcome-determinative actions that occurred during the original game. In particular, this invention relates to a method of condensing the action portions of a baseball game by recording the game on film or video tape, and editing it to retain the action portions, i.e., the last pitch thrown to the batters for each turn at the plate.

2. Description of Related Art

In a baseball game, there are nine players in the field, i.e., on defense, at positions of catcher, pitcher, first base, second base, shortstop, third base, left field, center field and right field. The batting, or offensive, team bats one player at a time, in turn. Each team's half-inning ends when the three outs have been recorded. An out can occur for a given batter only when the batter has struck out or batted the ball into play, although a batter can remain at the plate if a base runner is tagged out, i.e, in a pick-off or if caught steeling. The player (i.e., the batter) can only advance legally to first base and be a base runner as a result of the last pitch thrown to him in a given turn at the plate, i.e., he can hit safely, be awarded a base on balls, be struck by a pitch, or strike out and reach first safely after a dropped or passed third strike. Any runners on base advance under these circumstances or are tagged or forced out. There are other ways a base runner can advance before a batter's turn comes to an end, for example, by stealing base, or on account of a wild pitch or a balk.

During a baseball game, there is considerable time taken during each half inning in which there is only limited action on the field. For example, for a given player's turn at bat, there can be six or more pitches thrown before the player hits the ball into play, strikes out, or walks. In addition, there is often a great deal of time used in pick off attempts and conferences in the infield, and in changing places between half-innings. A nine-inning game can typically last between two and three hours, and sometimes longer.

BRIEF SUMMARY OF THE INVENTION

In accordance with an aspect of this invention, a film or video record is made of each player's turn at bat. The video record, which can be film, digital, or tape, is edited down to retain the last pitch thrown to each player, plus any resulting action for that pitch. This would record each safe base hit, each walk, strike out, sacrifice fly, ground out, etc. Of course, fielding would be recorded, i.e., each put-out, error, double-play, and throw-out. The resulting video record would be about 10 to 15 minutes, showing all the action of the game. Base running activity (i.e., activity that can also result in either an out or advancement of the runner) can also be retained, such as stolen bases and attempted steals, pickoffs, rundowns, balks, and wild pitches. Some additional material (e.g., narrative) can be included to explain pitching changes, pinch runners, and other substitutions that may affect play.

DETAILED DESCRIPTION OF THE INVENTION

In accordance with the invention, a film or video record is made of each player's turn at bat. Such a record is conventionally made as part of the original broadcast of most, if not all, professional, i.e., Major League Baseball games. The video record, which can be an analog record, such as film or videotape, or could be a digital record, is edited to retain the last pitch thrown to each player, plus any resulting action for that pitch as part of a consolidated record. Editing of either a complete analog or digital record of a pre-recorded baseball game is well within the skill in the art and requires no elaboration of the editing equipment or techniques. Editing of a digital record would be particularly easy and could be done using commercially available computers and off-the-shelf software. Such a reduced record would include each safe base hit, each walk, strike out, sacrifice fly, ground out, etc of every batter. Of course, the related fielding play associated with the action ensuring from the final pitch to a batter also would be retained as part of the recording e.g., each put-out, error, double-play, and throw-out. The resulting edited record of the baseball game would then be about 10 to 15 minutes, a considerable reduction from the standard 2-5 hours of a typical nine-inning professional baseball game. The edited record, however would show all of the action of the game that contributed directly to the outcome of the game. Base running activity (i.e., activity that can also result in either an out or advancement of the runner) should also generally be retained, such as stolen bases and failed attempted-steals, pickoffs, rundowns, balks, and wild pitches. If desired, some additional material (e.g., portions of an original soundtrack recorded by the announcers at the game or other added narrative) can be included in the editied record to explain pitching changes, pinch runners, and other substitutions that may affect play, as well as other aspects of the recorded action.

The completed (edited) version can be sold on a per-game basis, i.e., through a cable subscription arrangement, or delivered digitally over the Internet to subscribers, perhaps using a password and PIN assigned to the subscriber. The 10 to 15 minute video can also be used by professional scouts and others for purposes of player evaluation. The editing could take place immediately after each play, so that the recorded video could be released to its viewership immediately after the game. Each inning or half-inning can be packed as a unit, if desired. In this case, each pre-recorded inning, or half-inning could be supplied as the game is in progress. Thus, one could follow the game closely in time to when it is actually being played, while requiring only one-two minutes of attention to see all the action. This could increase interest in baseball, by making the game available, on a near-real-time basis, to fans some distance from the ball park, i.e., 75 miles or more. This could also permit satellite viewing of the game at remote locations, without requiring the full bandwidth that is needed for an unedited version or live telecast of the complete game.

The invention does not constitute merely a compilation of the highlights of a particular baseball game. Rather, the invention is directed to making a record of each and every outcome-determinative action that takes place during the complete game, while eliminating all of the action that ultimately does not impact on the outcome.

This procedure and the resulting action video can be used for other sports as well. In track and field, the last attempt or heat of each event could be recorded, e.g., the last pole-vault attempt for each athlete competing, and the last twenty meters of each race or heat. The invention would likewise apply in swimming and diving, or in figure skating. In horse racing, the final stretch and finish of each race would be recorded. This invention could also be adapted to baseball-related sports such as fast-pitch softball and cricket. The invention can be applied to net sports, e.g., capturing all game points in a tennis match, and capturing each score in volleyball. This system can also be adapted to show the important action in goal sports such as hockey, lacrosse, basketball, soccer, rugby, and football. The invention can also be used to feature target sports, i.e., to follow all the shots of a given player in golf or in billiards, or every roll in bowling.

The present invention has been described with reference to specific embodiments. However, this application is intended to cover those changes and substitutions that may be made by those skilled in the art without departing from the spirit and scope of the invention.

We claim:

1. A method of providing a subscription for viewing a recorded baseball game in which players from each team appear at bat, and attempt to place a pitched baseball into play and to reach base safely; with players failing to reach base safely being out and players on base attempting unsuccessfully to advance to another base being out; the method comprising: (1) recording each appearance-at-bat for every player and game action resulting from an appearance-at-bat to produce a game recording; (2) editing the game recording of each appearance-at-bat to produce an edited recording by deleting substantially all game action other than (i) game action from a final pitch thrown to each player, (ii) successful attempts of runners on base to advance to another base not associated with the game action resulting from the final pitch and (iii) unsuccessful attempts of the runners on base to advance to another base resulting in and out not associated with the game action resulting from the final pitch; (3) obtaining subscribers for viewing the edited recording and (4) playing or broadcasting the edited recording as a condensed recorded game for viewing by the subscribers.

2. The method of claim 1 wherein the edited recording for a nine-inning baseball game is about 15 minutes.

3. The method of claim 1 wherein said step of playing or broadcasting the edited recording for viewing is conducted over the Internet.

4. The method of claim 1 wherein said step of playing or broadcasting the edited recording for viewing is conducted by playing a videotape recording.

5. The method of claim 1 wherein the edited recording contains audio explaining any substitution of players.

* * * * *

(12) INTER PARTES REEXAMINATION CERTIFICATE (1305th)
United States Patent
Mockry et al.

(10) Number: US 7,628,716 C1
(45) Certificate Issued: Jul. 19, 2016

(54) METHOD OF RECORDING AND PLAYING BASEBALL GAME SHOWING EACH BATTER'S LAST PITCH

(75) Inventors: George M. Mockry, Montrose, CO (US); Greg M. Mockry, Massena, NY (US)

(73) Assignee: BASEBALL QUICK, LLC, Massena, NY (US)

Reexamination Request:
No. 95/002,347, Sep. 14, 2012

Reexamination Certificate for:
Patent No.: 7,628,716
Issued: Dec. 8, 2009
Appl. No.: 09/878,860
Filed: Jun. 9, 2001

Related U.S. Application Data

(60) Provisional application No. 60/211,208, filed on Jun. 13, 2000.

(51) Int. Cl.
*A63B 67/00* (2006.01)
*A63B 24/00* (2006.01)
*G11B 27/024* (2006.01)
*G11B 27/02* (2006.01)

(52) U.S. Cl.
CPC ............ *A63B 24/0003* (2013.01); *G11B 27/02* (2013.01); *G11B 27/024* (2013.01); *A63B 2220/806* (2013.01); *G11B 2220/90* (2013.01)

(58) Field of Classification Search
None
See application file for complete search history.

(56) References Cited

To view the complete listing of prior art documents cited during the proceeding for Reexamination Control Number 95/002,347, please refer to the USPTO's public Patent Application Information Retrieval (PAIR) system under the Display References tab.

*Primary Examiner* — Cameron Saadat

(57) ABSTRACT

A recorded complete baseball game is condensed into about fifteen minutes of action. All of the at-bat appearances of the players, in turn, are recorded, and then the recorded game is edited to leave only the last pitch thrown to each player, plus any action ensuing after that pitch and any attempts of runners to advance to another base and any other outs, such a runner as being picked off base. Then the recorded edited game is presented to viewers as a condensed game. The condensed game can be presented to subscribers over the Internet, or may be presented on film or as a video recording.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-5 are cancelled.

\* \* \* \* \*